US010612207B1

(12) United States Patent
Jordan, IV et al.

(10) Patent No.: US 10,612,207 B1
(45) Date of Patent: Apr. 7, 2020

(54) LANDSCAPING TIE

(71) Applicant: Jordan Forest Products, LLC, Mt. Gilead, NC (US)

(72) Inventors: Robert B. Jordan, IV, Mt. Gilead, NC (US); Joey Lee Brock, Mt. Gilead, NC (US); Eddie Alexander Meeks, Greensboro, NC (US)

(73) Assignees: Robert B. Jordan, IV, Mt. Gilead, NC (US); Eddie Alexander Meeks, Greensboro, NC (US)

( * ) Notice: Subject to any disclaimer, the term of this patent is extended or adjusted under 35 U.S.C. 154(b) by 0 days.

(21) Appl. No.: 16/028,553

(22) Filed: Jul. 6, 2018

Related U.S. Application Data

(60) Provisional application No. 62/531,391, filed on Jul. 12, 2017.

(51) Int. Cl.
*E02D 29/02* (2006.01)
*A01G 9/28* (2018.01)

(52) U.S. Cl.
CPC ........... *E02D 29/0266* (2013.01); *A01G 9/28* (2018.02); *E02D 2300/0006* (2013.01); *E02D 2300/0071* (2013.01); *E02D 2600/20* (2013.01)

(58) Field of Classification Search
CPC ........ E03D 29/0266; E03D 2300/0071; E03D 2600/20; E03D 2300/006; A01G 9/28
USPC ......................................................... 52/102
See application file for complete search history.

(56) References Cited

U.S. PATENT DOCUMENTS

| 3,520,082 A * | 7/1970 | Smith ...................... A01G 9/28 47/33 |
| 3,698,692 A * | 10/1972 | Burrows, Jr. ......... E04H 17/168 256/19 |
| 3,762,113 A | 10/1973 | O'Mullan et al. .............. 52/102 |
| 4,106,254 A * | 8/1978 | Jack ........................ B27F 1/005 217/65 |
| 4,278,364 A | 7/1981 | Frelmer ......................... 405/273 |
| 4,815,897 A | 3/1989 | Risi et al. ...................... 405/284 |
| 4,834,585 A | 5/1989 | Hasenwinkle et al. ....... 405/286 |
| 4,905,409 A | 3/1990 | Cole ................................ 47/33 |
| 4,910,910 A | 3/1990 | Jones ............................... 47/33 |
| 4,945,675 A * | 8/1990 | Kendrick ............ F21V 21/0824 47/33 |
| 5,157,867 A * | 10/1992 | Fritch ...................... A01G 9/28 47/33 |
| 5,168,678 A | 12/1992 | Scott, Jr. et al. ............... 52/102 |
| 5,375,369 A | 12/1994 | VerHoeve ......................... 47/33 |

(Continued)

FOREIGN PATENT DOCUMENTS

| CA | 2215858 | 10/1997 | ............. E01C 11/22 |
| CN | 105356346 A | * 2/2016 | |

*Primary Examiner* — Jeanette E Chapman
(74) *Attorney, Agent, or Firm* — MacCord Mason PLLC

(57) ABSTRACT

A landscaping tie system comprised of landscaping timbers and connectors. The landscaping timber comprises four flat boards each having an inside face, an outside face and two end edges. The four flat boards are mounted onto a center joint so that the four flat boards define a perimeter face of a timber and an inner channel inside the perimeter face, whereby the center joint is positioned within the inner channel. Two landscaping timbers may be joined by a connector with an outer profile to nest within the channel of each of the two landscaping timbers to establish an increased size timber arrangement.

21 Claims, 14 Drawing Sheets

(56) References Cited

U.S. PATENT DOCUMENTS

| | | | | |
|---|---|---|---|---|
| 5,410,458 | A * | 4/1995 | Bell | F21V 21/0824 |
| | | | | 362/219 |
| 5,442,877 | A * | 8/1995 | Lindhal | A01G 9/28 |
| | | | | 47/33 |
| 5,535,545 | A * | 7/1996 | Matz | F21V 21/0824 |
| | | | | 47/33 |
| 5,542,787 | A * | 8/1996 | Charlanow | E02D 29/025 |
| | | | | 403/231 |
| 5,611,641 | A * | 3/1997 | Christensen | E01F 13/022 |
| | | | | 256/1 |
| 6,021,600 | A | 2/2000 | Everett | 47/33 |
| 6,324,782 | B1 | 12/2001 | Gaston | 47/33 |
| 6,389,742 | B1 * | 5/2002 | Wuster | A01G 9/28 |
| | | | | 47/33 |
| 6,925,753 | B1 * | 8/2005 | Mallory | A01G 9/28 |
| | | | | 47/33 |
| 9,345,199 | B2 * | 5/2016 | Flynn | A01G 9/28 |
| 2004/0048055 | A1 * | 3/2004 | Branca | E04B 1/30 |
| | | | | 428/297.4 |
| 2004/0088929 | A1 | 5/2004 | Dawson et al. | 52/102 |
| 2005/0081437 | A1 * | 4/2005 | Heinemann | A01G 9/28 |
| | | | | 47/33 |
| 2005/0166527 | A1 | 8/2005 | Ernest et al. | 52/716.1 |
| 2005/0193647 | A1 | 9/2005 | Jones | 52/169.1 |
| 2005/0252101 | A1 | 11/2005 | Anderson et al. | 52/102 |
| 2006/0096169 | A1 * | 5/2006 | Love | A01G 9/28 |
| | | | | 47/10 |
| 2009/0094917 | A1 | 4/2009 | McIntosh | 52/311.1 |
| 2013/0031848 | A1 | 2/2013 | Perotti et al. | 52/102 |

* cited by examiner

LANDSCAPING TIE

BACKGROUND OF THE INVENTION

The present invention relates to a landscaping tie system for outdoor use. Landscaping ties provide a decorative means for defining boundaries and spaces within a yard. Stacking landscaping ties near a garden can also help build a wall to retain water and prevent run-off. Ideally, a landscaping tie system should be designed to accommodate a variety of configurations while remaining easy to assemble and aesthetically pleasing. Applicant wishes to further enhance the aesthetic qualities and functional capabilities of landscaping ties, while at the same time, keeping the design of the ties easy to assemble and retaining the capability of assembling in a variety of configurations.

SUMMARY OF THE INVENTION

The present invention fulfills one or more of these needs in the art by providing a landscaping tie system with each tie having a channel for easily connecting with other landscaping ties and housing electrical fittings within. In one embodiment, a landscaping timber comprises four flat boards each having an inside face, an outside face and two longitudinal edges. Each of the inside face, outside face and longitudinal edges of one board is positioned at right angles to the inside face, outside face and longitudinal edges of the next adjacent board. The four flat boards are arranged so that each of the four flat boards has an longitudinal edge abutting the inside face of the next adjacent board and so that the four flat boards define a perimeter face of a timber and an inner channel inside the perimeter face. Each board may be fastened to the longitudinal edge that abuts it.

In one embodiment, each board is fastened to the longitudinal edge that abuts it with a mechanical fastener. In another embodiment, each board is fastened to the longitudinal edge that abuts it with an adhesive. In another embodiment, each board has one of its longitudinal edges including a tongue and a groove on the inside face at an opposing longitudinal edge of each board whereby each board is connected by inserting the tongue into the groove of the next adjacent board.

In another embodiment, the landscaping timber comprises four flat boards each having an inside face, an outside face and two longitudinal edges, each of the inside face, outside face and longitudinal edges at right angles to each next adjacent one of the inside face, outside face and longitudinal edges. The four flat boards are mounted onto a center joint comprised of a prism, so that the four flat boards define a perimeter face of a timber and an inner channel inside the perimeter face, whereby the center joint is positioned within the inner channel. The center joint may further include a channel adapted to receive a connector for joining with another landscaping timber.

The boards may be comprised of wood. In an alternative embodiment, the board may be comprised of plastic or wood-filled plastic. The plastic or wooden boards may further include decorative ribs or patterns. The four flat boards may be arranged so that each of the four flat boards has a longitudinal edge abutting the inside face of the next adjacent board and so that the four flat boards define a perimeter face of a timber and an inner channel inside the perimeter face.

Each landscaping timber is adapted to be joined by a connector to another landscaping timber. The connector has an outer profile to nest within the channel of each of the two landscaping timbers to establish an increased size timber arrangement. In some embodiments, the connector nests within a channel of the center joint of each of the two landscaping timbers.

In certain embodiments, the connector has a length with an angle other than 180°. The landscaping timber may also further include an end cap at least partially inserted within the inner channel.

In some embodiments, an electrical conductor passes through the channel and is operatively connected to an electrical fitting on one of the boards. For example, the electrical fitting may be an electrical outlet.

According to another aspect of the disclosure, a connector configured to connect two or more landscaping timbers is provided. The connector comprises a body comprising a hollow prism having a plurality of faces, a first male element protruding from a first face of the body and adapted to be inserted into a channel of a first landscaping timber, and a second male element protruding from a second face of the body and adapted to be inserted into a channel of a second landscaping timber. An electrical box is installed within the hollow prism and accessible on a third face of the body, and an electrical conduit hole is provided within each connector for electrical wire routing to the electrical box. The first male element and the second male element may further include holes that are adapted to receive a fastener for securing the first and second male element to the first and second landscaping timbers.

In one embodiment, the first face is located adjacent to the second face of the body whereby the first male element and the second male element are adapted to connect two landscaping timbers at an angle less than 180 degrees. For example, the angle may be about 90 degrees. In another embodiment, the first face is located on an opposing side of the body in relation to the second face whereby the first male element and the second male element are adapted to connect two landscaping timbers at an angle of about 180 degrees.

The body of the connector may comprise a variety of shapes. For example, the body may be substantially cuboidal. In another example, the body may be substantially pentagonal.

In another embodiment, the landscaping system comprises a plurality of landscaping timbers with a plurality of connectors. Each landscaping timber of the landscaping system comprises four flat wooden boards each having an inside face, an outside face and two longitudinal edges, each of the inside face, outside face and longitudinal edges at right angles to each next adjacent one of the inside face, outside face and longitudinal edges. The four flat wooden boards are arranged so that each of the four flat wooden boards has a longitudinal edge abutting the inside face of the next adjacent wooden board and so that the four flat wooden boards define a perimeter face of a timber and an inner channel inside the perimeter face. Each board is fastened to the longitudinal edge that abuts it. Each connector is adapted for joining two landscaping timbers by having an outer profile configured to nest within the channel of the two landscaping timbers.

The invention can also be considered as a method for arranging a set of landscaping timbers comprising partially inserting a connector into a channel of a first landscaping timber, and connecting a second landscaping timber to the first landscaping timber by inserting the remaining exposed portion of the connector into a channel at an end of the second landscaping timber.

In one example, the method may comprise aligning the second landscaping timber end to end with the first landscaping timber. The second landscaping timber is then inserted into the remaining exposed portion of the connector into the channel of the second landscaping timber such that the first and second landscaping timbers are mated with their ends abutting one another.

In another example, the method may comprise aligning the second landscaping timber at an angle with the first landscaping timber. The second landscaping timber is then inserted into the remaining exposed portion of the connector into the channel of the second landscaping timber such that the end of the second landscaping timbers abuts the face of the first landscaping timber.

The method may further include the step of stacking the connected first and second landscaping timbers with a plurality of other connected landscaping timbers. The method may also include plugging an electronic device into an outlet on the face of the first landscaping timber.

BRIEF DESCRIPTION OF THE DRAWINGS

The invention will be better understood by a reading of the Detailed Description of the Examples of the Invention along with a review of the drawings, in which.

DETAILED DESCRIPTION OF EXAMPLES OF THE INVENTION

Figure 1:
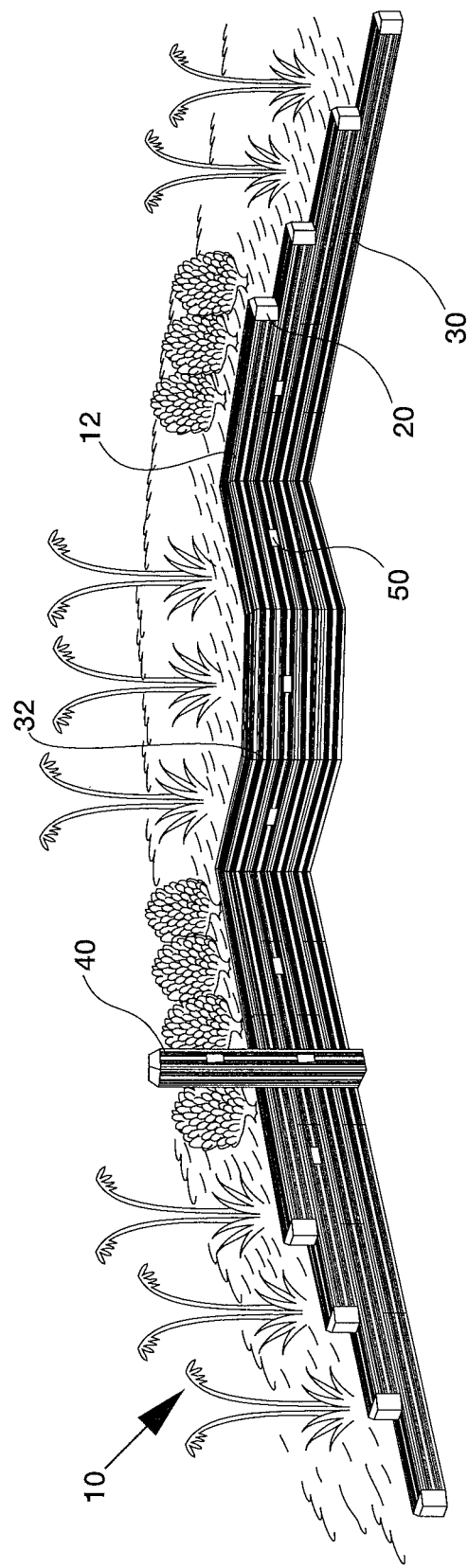
FIG. 1 is a front perspective view of a landscaping tie system constructed according to one embodiment.

FIG. 1 shows one embodiment of a landscaping tie system 10 with a plurality of landscaping timbers 12 connected with one another. Timbers configured as railroad ties are popular landscaping items, but they are heavy, difficult to work with, and lack some utility. As used herein, "tie" and "timber" encompass timbers that may simulate the look of railroad ties. As seen in FIG. 3, each landscaping timber 12 includes a channel 16 adapted to receive a connector 14 that joins one timber to another. Two landscaping timbers may have their ends directly abutting one another at an angle 30 that is substantially 180 degrees. The landscaping timbers may also be arranged such that their ends are abutting one another at an angle 32 less than 180 degrees. The landscaping timbers may also be vertically arranged to foim a post 40, as seen in FIG. 2.

As seen in FIG. 1, end caps 20 may be installed onto an end of a landscaping timber 12 that does not have an adjacent timber. Electrical fittings 50 may also be installed with conductors within the channels 16 of one or more landscaping timbers 12.

Figure 2:
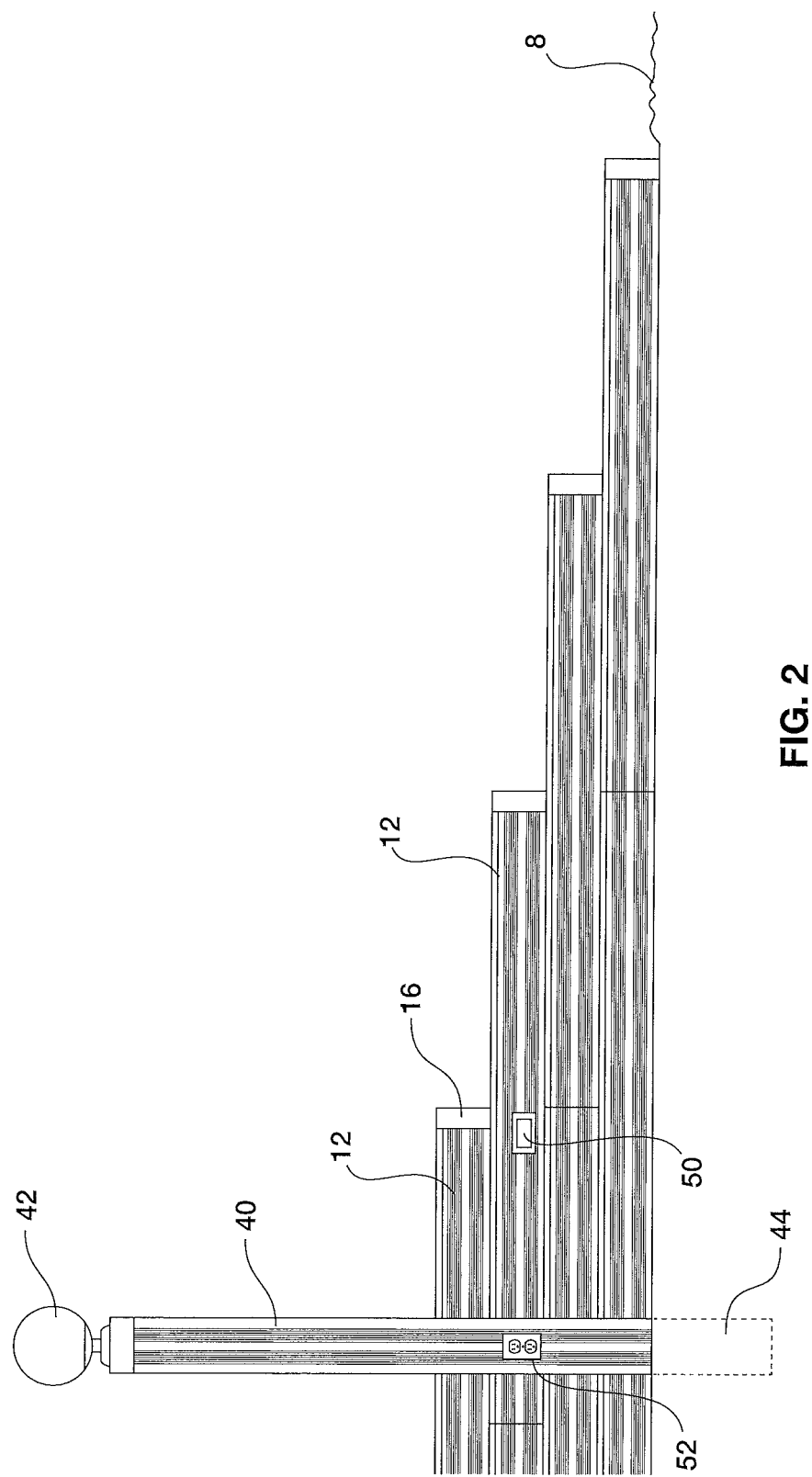
FIG. 2 is an enlarged side elevational view of a plurality of connected landscaping timbers further including a post.
Figure 3:
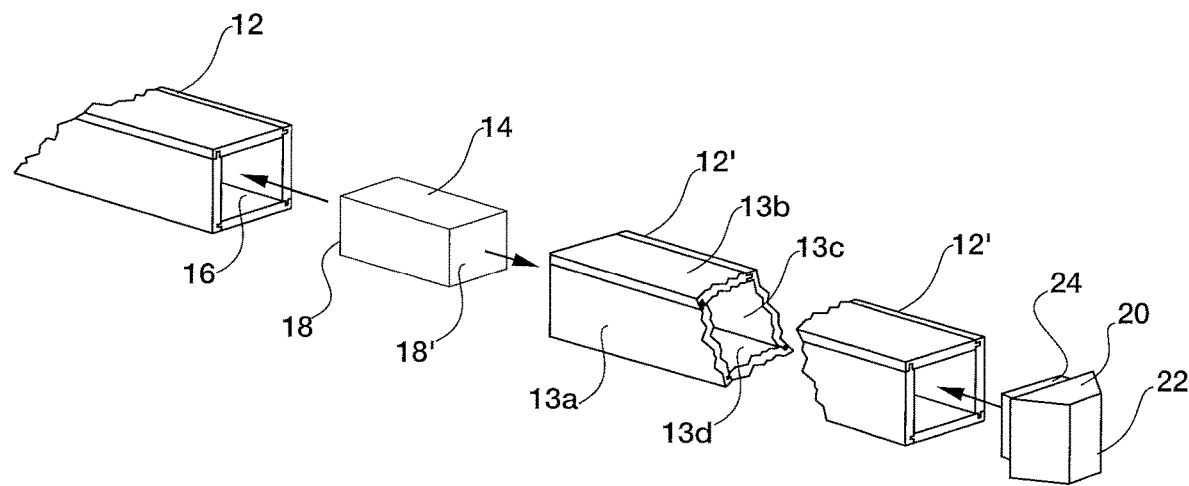
FIG. 3 is an enlarged exploded view of several landscaping timbers partially disassembled.

FIG. 2 shows a plurality of landscaping timbers 12 laid horizontally and parallel to the ground 8. Optional decorative ribbings are not shown on the bottom two courses of landscaping timbers in FIG. 2 for illustrative purposes to show the ends of paired landscaping timbers 12 joined together. Some landscaping timbers 12 may include an electrical fitting 50, such as a light or an electrical switch. Other forms of electrical fittings 50 may include audio, visual or digital wiring or fiber optics. Post 40 may also include an electrical fitting 52. In the example shown, post 40 includes an electrical outlet 52 for providing power to fixtures and other accessories. As seen in FIG. 1, post 40 may include a decorative end cap at the top end. Alternatively, as shown in FIG. 2, post 40 may include a light fixture 42. The other end 44 of post 40 is installed into the ground 8.

Figure 4:
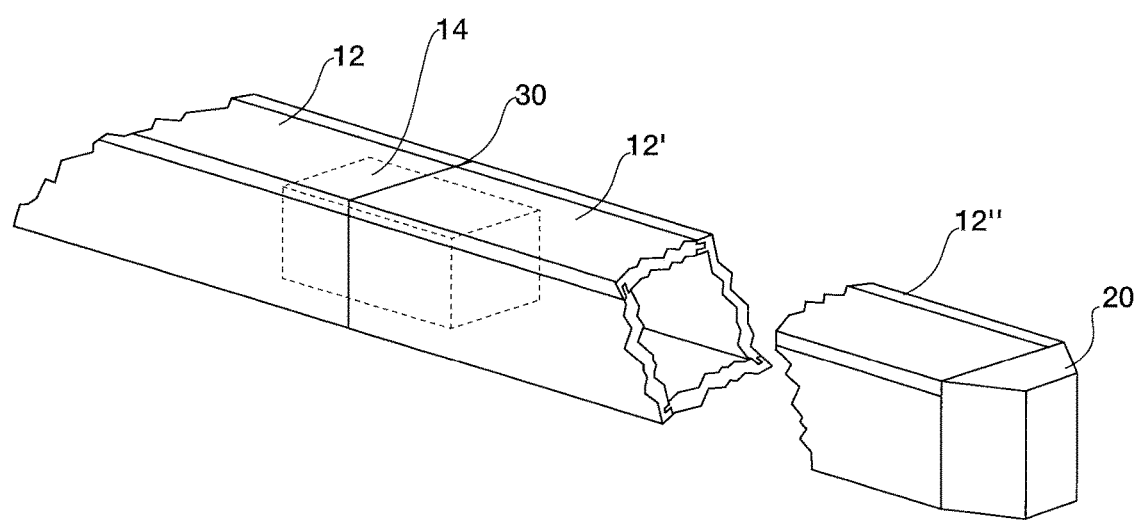
FIG. 4 is an enlarged perspective of the landscaping timbers in FIG. 3 assembled with the timbers broken away to save space on the page and show that the length can be varied.

FIG. 3 is a disassembled view illustrating how two landscaping timbers 12 and 12' may be joined together. Each landscaping timber includes a channel 16 formed as a space between assembled boards 13a-d. Channel 16 is adapted by size and shape to receive a connector 14 at an end of the landscaping timber. One end 18 of connector 14 is inserted into the channel 16 of landscaping timber 12, and the other end 18' of connector 14 is inserted into the channel of landscaping timber 12' as seen in FIG. 4. Similarly, an end cap 20 may be inserted into a channel accessible at the right-hand longitudinal edge of landscaping timber 12' as shown in FIG. 3. End cap 20 may include a decorative component 22 and an insertion component 24 that fits into the channel of landscaping timber 12'.

Connector 14 and insertion component 24 both preferably have outside dimensions so they fit snuggly within their respective channels 16. The size of the channel is determined by the sizes and assembly of the boards making up the timbers. If desired, connectors can be cut or formed to have a taper or draw, so that they are easily inserted, yet firmly grip the inside faces of the boards making up the timbers when fully inserted. In other embodiments, a looser fit may be useful.

FIG. 4 illustrates the components of FIG. 3 assembled together. Once the ends 18 and 18' of connector 14 are inserted into channels 16, the landscaping timbers 12 and 12" are pressed together until their ends substantially abut one another and connector 14 is housed within their channels. End cap 20 is installed by inserting the insertion component 24 until the decorative component 22 flushly abuts the end of landscaping timber 12'. As shown, the angle 30 between landscaping timbers 12 and 12' is substantially 180 degrees (i.e., the timbers 12 and 12' are in a straight line).

Figure 5:
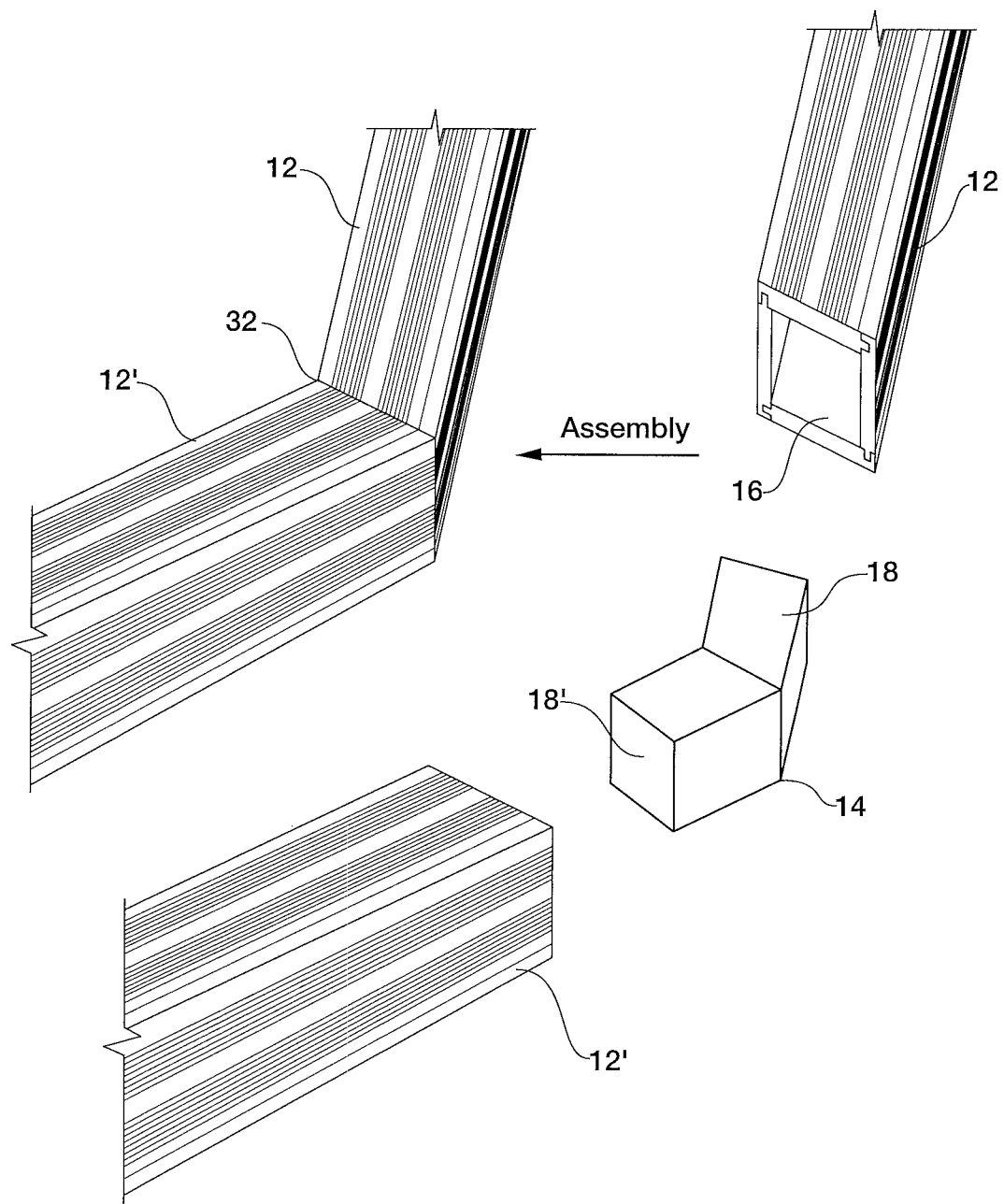
FIG. 5 is an enlarged perspective view of a connected and a disconnected pair of landscaping timbers according to one embodiment.

Other embodiments may conjoin two landscaping timbers at an angle other than 180 degrees. For example, FIG. 5 depicts a pair of landscaping timbers 12 and 12' conjoined at an angle 32 of less than 180 degrees. The pair of landscaping timbers 12 and 12' are assembled together by inserting a connector 14 having a first end 18 disposed at an angle from the second end 18'. First end 18 is inserted into channel 16 of landscaping timber 12, and second end 18' is inserted into the respective channel of landscaping timber 12'.

Figure 6:
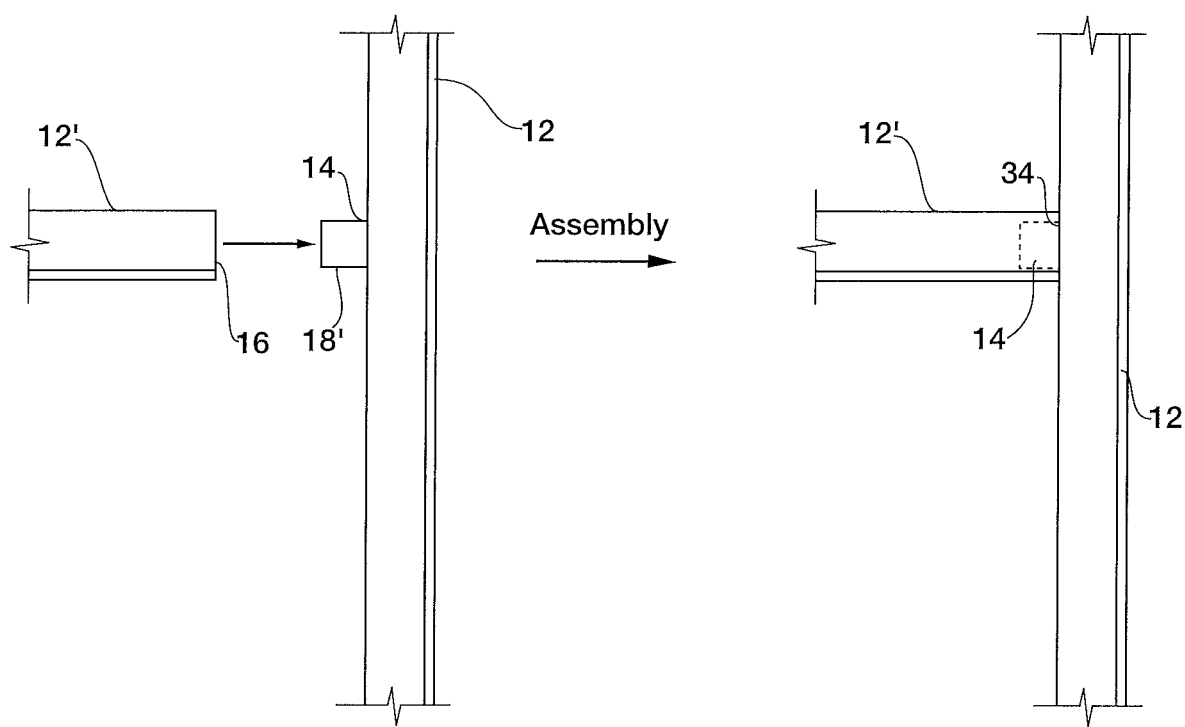
FIG. 6 is an enlarged top view of a connected and a disconnected pair of landscaping timbers according to one embodiment.

The landscaping timbers may be connected in other configurations, not limited to adjoining their ends together. FIG. 6 shows one configuration wherein the connector 14 is partially inserted at one end (not shown) into a channel accessible from an outer face of a board. The other end 18' of connector 14 is inserted into a hole in one of the boards and into the channel 16 of landscaping timber 12', resulting in a configuration wherein landscaping timber 12' is substantially perpendicular to landscaping timber 12.

Figure 7:
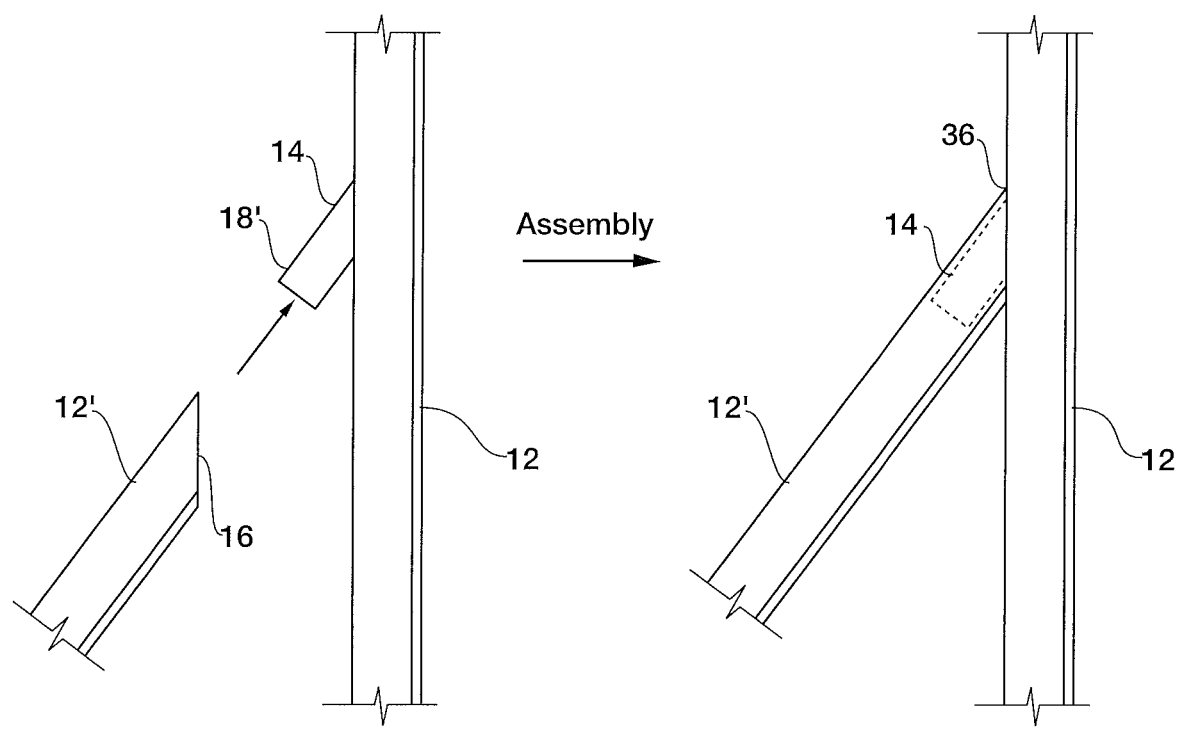
FIG. 7 is an enlarged top view of a connected and a disconnected pair of landscaping timbers according to one embodiment.

As seen in FIG. 7, the connector 14 may alternatively include angled ends to provide additional configurations for adjoining two landscaping timbers. One end of connector 14 (not shown) may be inserted into a channel accessible from an outer face of landscaping timber 12. The other end 18' of connector 14 is angled away from end 18 and enables landscaping timber 12' to be adjoined to landscaping timber 12 at an angle 36 less than 180 degrees.

The ends of landscaping timbers may be cut for use with angled connectors 14 (wherein the connector's ends are at an angle other than 180 degrees) to conceal the connector 14 and flushly adjoin the two landscaping timbers.

In some embodiments, the connector 14 may be integrated with a landscaping timber 12. For example, connector 14 may be integrated by adhering to an outer face of a board 13 as shown in FIG. 7. Alternatively, a connector 14 can be formed of a plastic with a surrounding flange, so the flange can be held by screws or the like on the face of timber 12, with a connector shape 14 thus protruding from the face of the timber 12 so it can be inserted into a channel of timber 12'. Connectors 14 of any shape may be constructed of wood, composite material or plastic as in injection molding processes.

Figure 8:
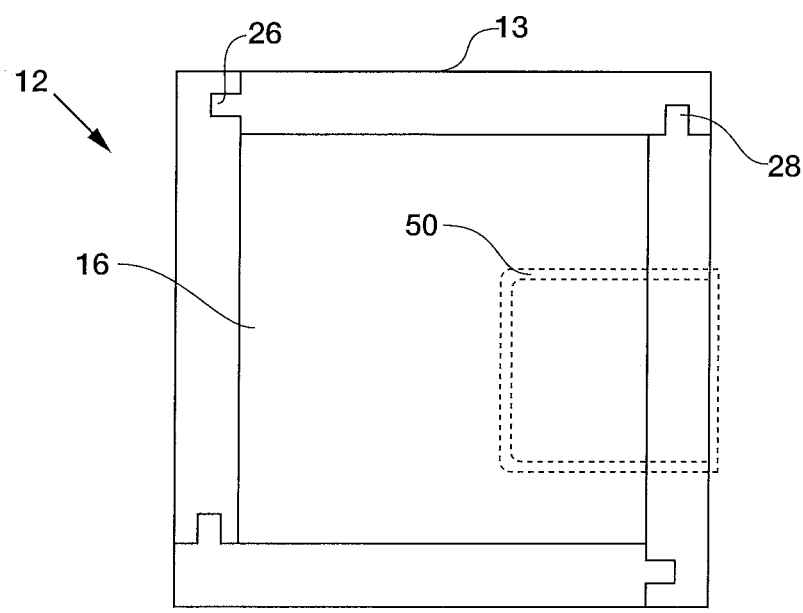
FIG. 8 is a cross-sectional view of a landscaping timber according to one embodiment.
Figure 9:
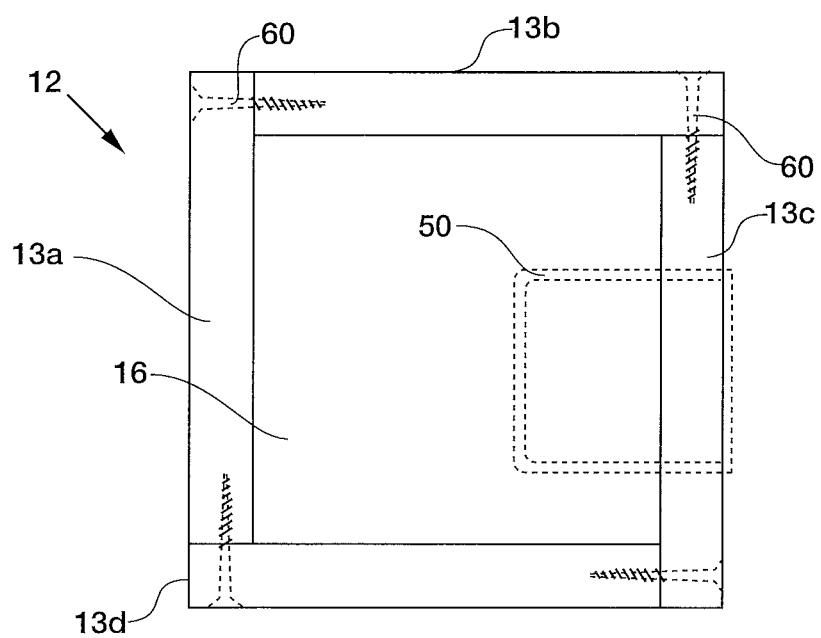
FIG. 9 is a cross-sectional view of a landscaping timber according another embodiment.

Various methods may be used to assemble the boards 13 to form a landscaping timber. FIG. 8 shows one example of a landscaping timber 12 formed from four boards 13 connected via tongue-and-groove joints. Each board 13 includes a tongue 26 at one side edge and a groove 28 along the inner face of an opposite end. Tongue 26 is inserted into an adjacent board's groove 28. Adhesive may be applied to maintain the tongue 26 within the groove 28 once it is inserted. Other joints may also be used in combination with an adhesive. FIG. 9 shows an alternative embodiment wherein the boards are fastened together using screws. The screws may be countersunk to create a flush appearance. In these two embodiments, the four flat boards are arranged so that each of the four flat boards has a longitudinal edge abutting the inside face of the next adjacent board and so that the four flat boards define a perimeter face of a timber and an inner channel inside the perimeter face. Other configurations of perimeter boards affixed to a central joint can be used.

In a preferred embodiment, each board is comprised of wood. Preferably, each board has been continuous, kiln dried, patterned, reverse grooved, and end matched. A preferred board species is Southern yellow pine. Preferably the boards have had "EcoLife" treatment with a non-metallic preservative and stabilizer system. EcoLife treatment provides an environmentally friendly protection that is expected to prevent rot for over 30 years. EcoLife treatment is available from Viance LLC of Charlotte, N.C. and is a non-metallic preservative and stabilizer system, offering the natural beauty of real wood combined with advances in weathering protection and fastener performance. In one example, the landscaping timber is constructed from ribbed weather-proofed boards fastened together to form a channel that is approximately 6 inches by 6 inches by 6 feet. However, in other embodiments, the boards may be comprised of plastic or a wood-filled plastic, such as a theuiio-plastic. The boards may be molded to simulate the look of wood through either an injection molding or extrusion process.

Figure 10:
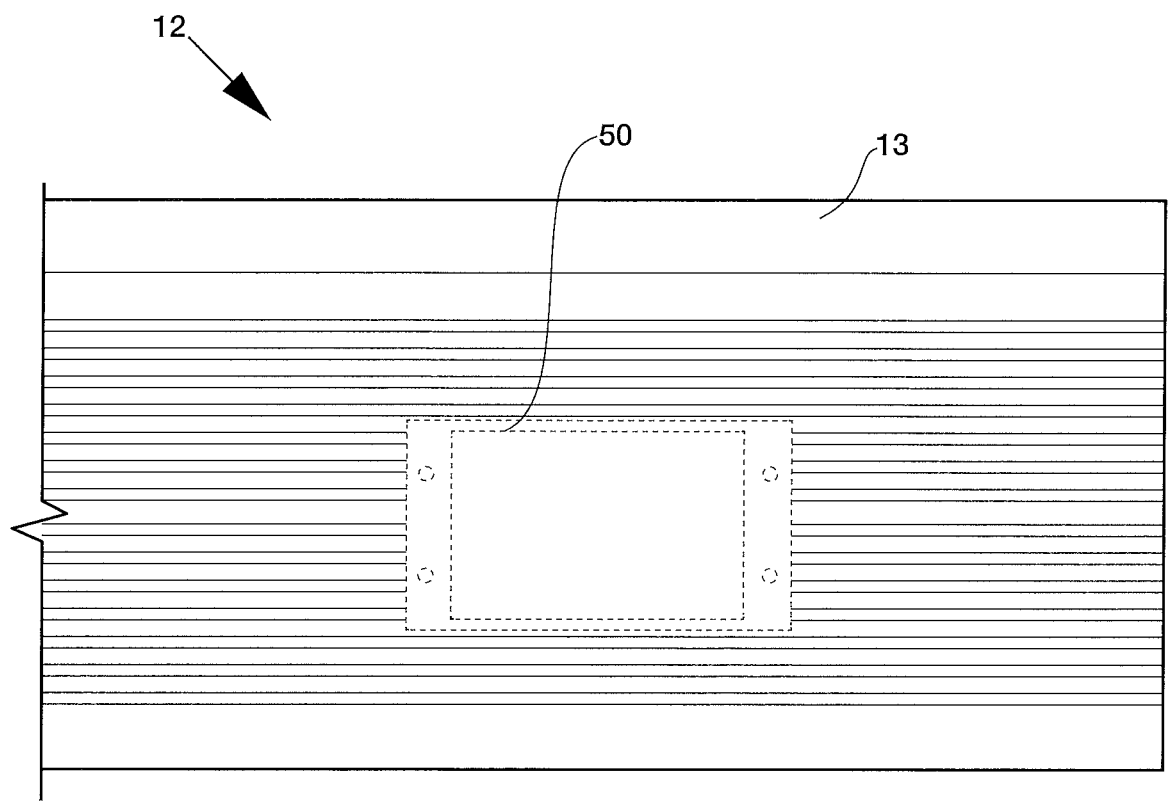
FIG. 10 is an enlarged front elevational view of a landscaping timber with an electrical fitting.

The channel 16 may also be adapted for installing an electrical fitting onto one of the boards 13. FIGS. 8-10 illustrate one embodiment wherein an electrical box 50 is installed within the channel 16 of landscaping timber 12. The electrical box 50 may be accessible from an outer face, as seen in FIG. 10.

Figure 11:
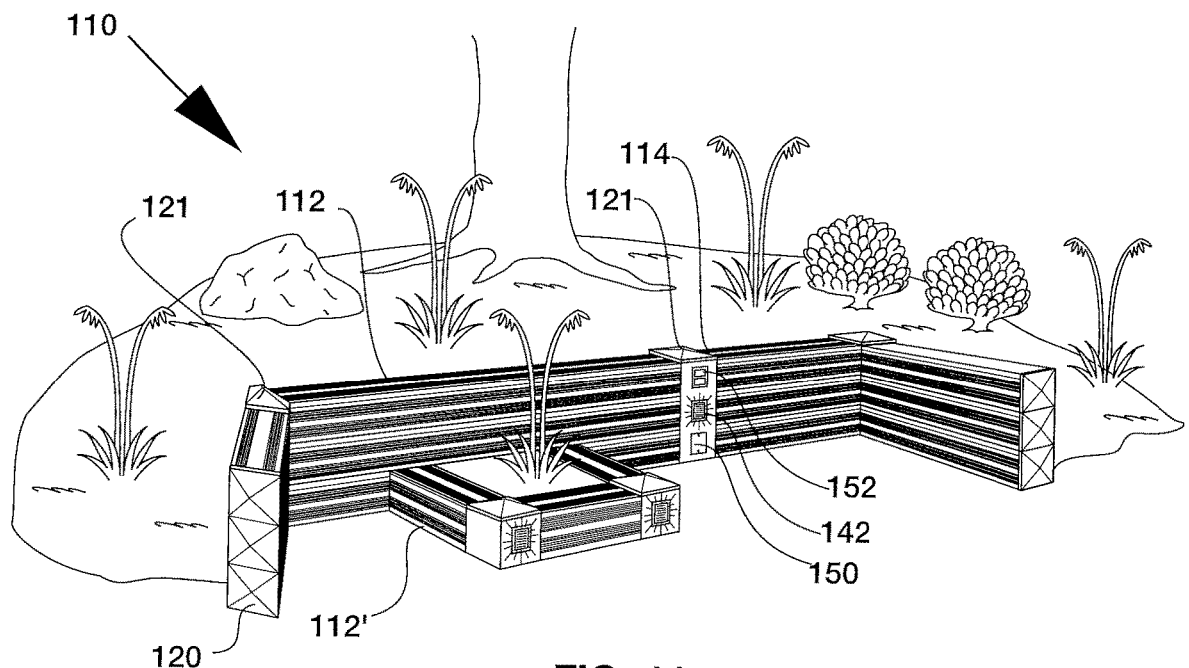
FIG. 11 is a front perspective view of a landscaping tie system constructed according to another embodiment.
Figure 12:
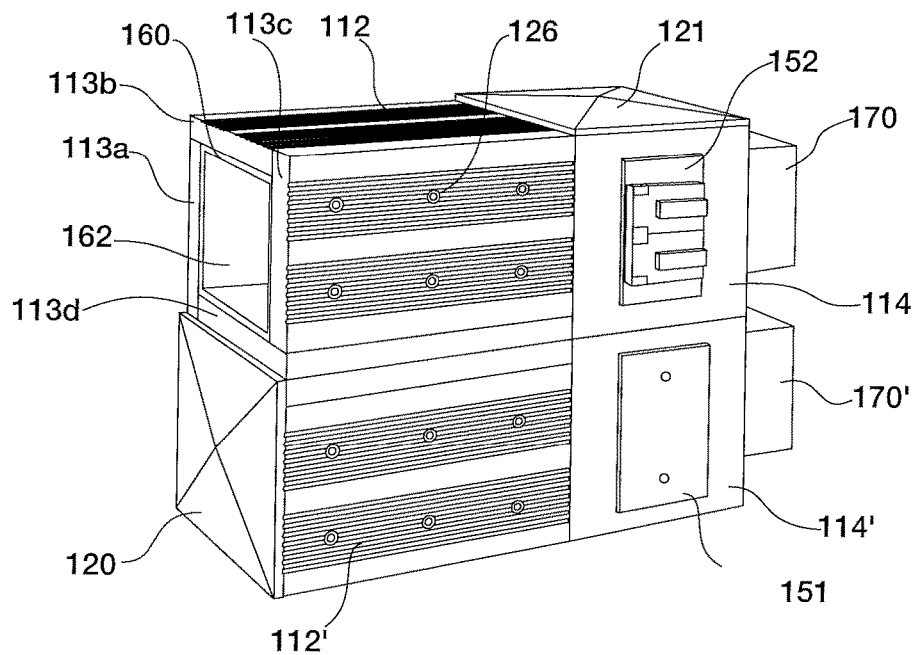
FIG. 12 is a front perspective view of a pair of landscaping timbers connected to a connector.

FIG. 11 shows another embodiment of a landscaping tie system 110 with a plurality of landscaping timbers 112 connected with one another via a plurality of connectors 114. As seen in FIG. 12, each board of landscaping timber 12 is affixed to a center joint 160, which includes a channel 162 adapted to receive a connector 114 that joins one timber to another. End caps 120 may be installed onto an end of a landscaping timber 112 that does not have an adjacent timber. Electrical fittings 150 may also be installed within one or more connectors 114.

The connector 114 may connect the landscaping timbers at an angle that is substantially 180 degrees. The landscaping timbers may also be arranged such that they form an angle less than 180 degrees. For example, in some embodiments, the landscaping timber may include a mounted connector 180 (see FIG. 15) to connect a second landscaping timber 112' on a face of the landscaping timber at an angle of about 90 degrees. The connector 114 may be vertically stacked with one or more connectors 114' to enable the landscaping timbers 112 to be arranged in a vertical stack. Connectors 114 may include electrical fittings 150, such as an electrical outlet 152 or a light 142. Other forms of electrical fittings 150 may include audio, visual or digital wiring or fiber optics.

FIG. 12 shows a pair of landscaping timbers 112 and 112' laid horizontally and parallel, and connected to connectors 114 and 114', respectively. Connectors 114 and 114' are connected to one another to provide stability. As shown, connector 114 includes an electrical outlet 152 and connector 114' includes a cover 151 over the electrical box 150. Each landscaping timber 112 is formed from four boards 113 mounted onto a center joint 160.

Figure 13:
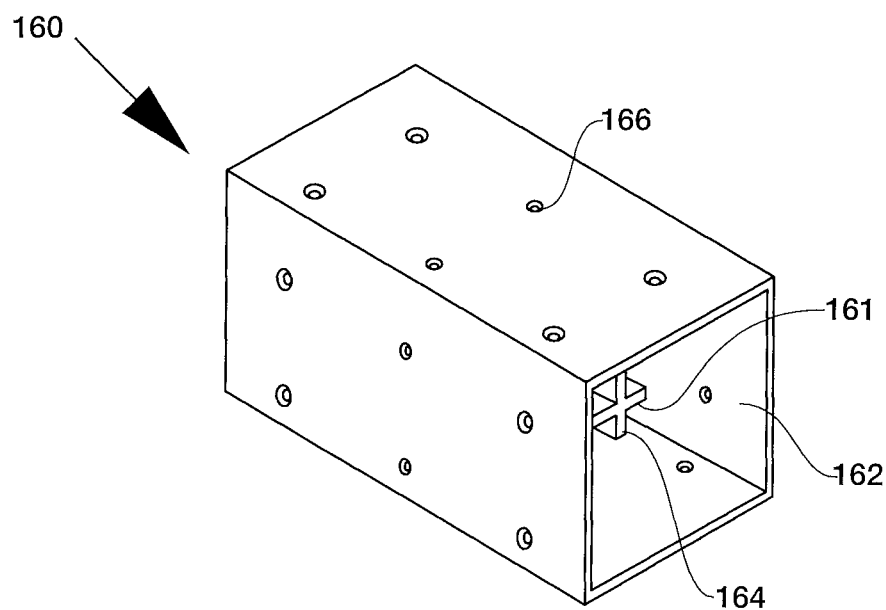
FIG. 13 is an overhead perspective view of a center joint for mounting boards according to one embodiment.
Figure 14:
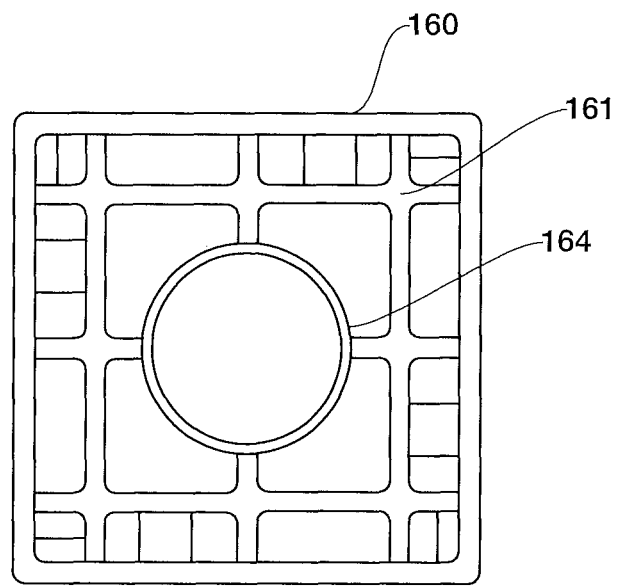
FIG. 14 is a front perspective view of the center joint shown in FIG. 13.

One embodiment of a center joint 160 is shown in FIGS. 13 and 14. The center joint 160 is comprised of a prism for mounting the boards 113. In the embodiment shown, the center joint 160 is a cuboid and includes a grid 161 within the joint to add strength. The grid is recessed from the end of the joint to leave room for a channel 162 adapted to receive a connector 114. The channel may also include an electrical conduit 164 within grid 161 for passing electrical wires through the landscaping timbers 112. Each board 113a-d may be mounted onto a face of the center joint 160 by inserting fasteners 126 (shown in FIG. 12) into holes 166 (shown in FIG. 13).

Figure 15:
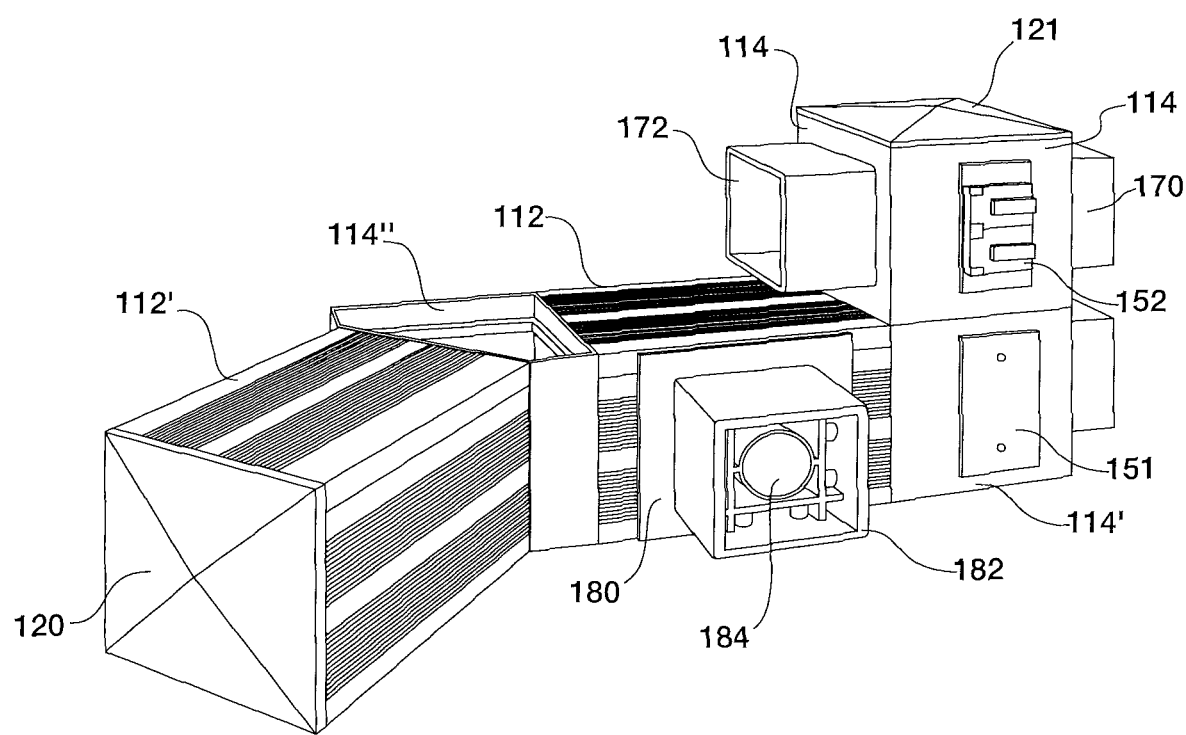
FIG. 15 is a front perspective view of a landscaping system having a plurality of connectors and landscaping timbers.

FIG. 15 depicts another embodiment of a landscaping tie system. The first landscaping timber 112 is connected at one end to a connector 114 stacked onto another connector 114'. The other end of the first landscaping timber 112 and a second landscaping timber 112' are connected to a connector 114" and having an angle less than 180 degrees. The first landscaping timber 112 further includes a surface mounted connector 180 having a channel 182 and an electrical conduit 184 adapted for receiving a third landscaping timber. End caps 120 and 121 may be added to a free end of the landscaping timber 112' and connector 114, respectively.

Figure 16:
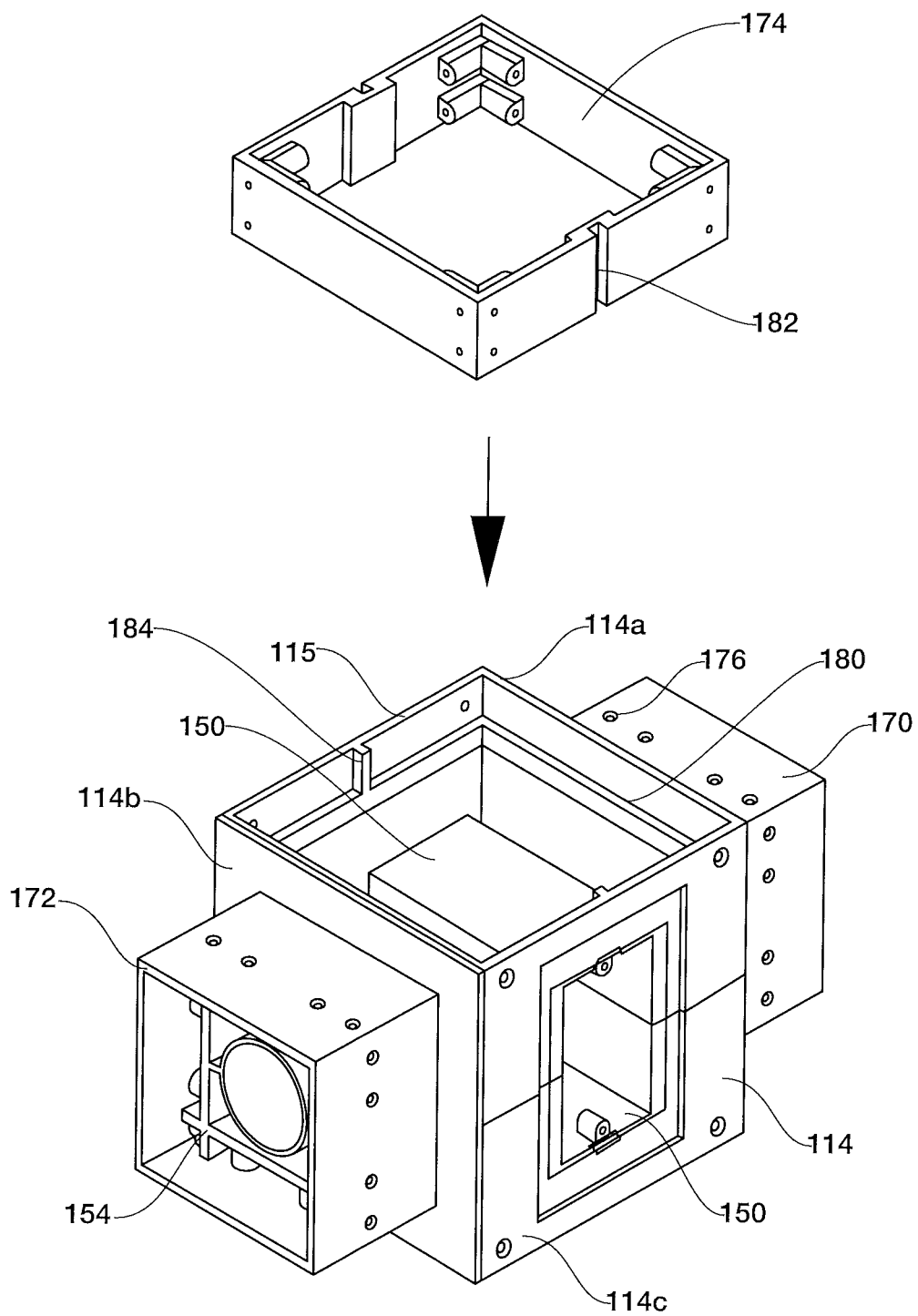
FIG. 16 is an overhead perspective view of a connector according to one embodiment.

One example of a connector 114 is shown in FIG. 16. The connector 114 includes a body having a plurality of faces. Faces on the body may be adapted for insertion into a channel 162 of a landscaping timber 12 or a center joint 116. The recessing of the grid 161 in the center joint 116 leaves room for this insertion. In the example shown, a first male element 170 protrudes from a first face 114a of the body 114, and a second male element 172 protrudes from a second face 114b. The first male element 170 and second male element 172 are positioned on opposing faces of the body, such that two landscaping timbers may be connected at an angle of about 180 degrees. The body may include an electrical box 150 accessible on a third face 114c. The first male element 170 and second male element 172 may further include an electrical conduit for receiving electrical wiring.

The body may also include a locking assembly 174 adapted to be installed on a top portion 115 (or bottom) of the body. The locking assembly 174 enables another connector 114' or an end cap 121 to be securely mounted onto the top portion 115 (or bottom) of connector 114. In the embodiment shown, each body includes a set of ledges 180 on a top portion 115 and bottom portion, whereby one end of the locking assembly 174 sits either on top of or below the ledge (depending on which end of the body that the locking assembly 174 is inserted. The other end of the locking assembly 174 is fitted within another connector 114' and stops at its ledge. The locking assembly also includes a channel 182 adapted to receive a projection 184 on each connector 114 to further secure the two connectors 114 and 114' into place. Locking assembly 174 thus prevents a connector 114 that is on top of another connector from moving laterally.

Figure 17:
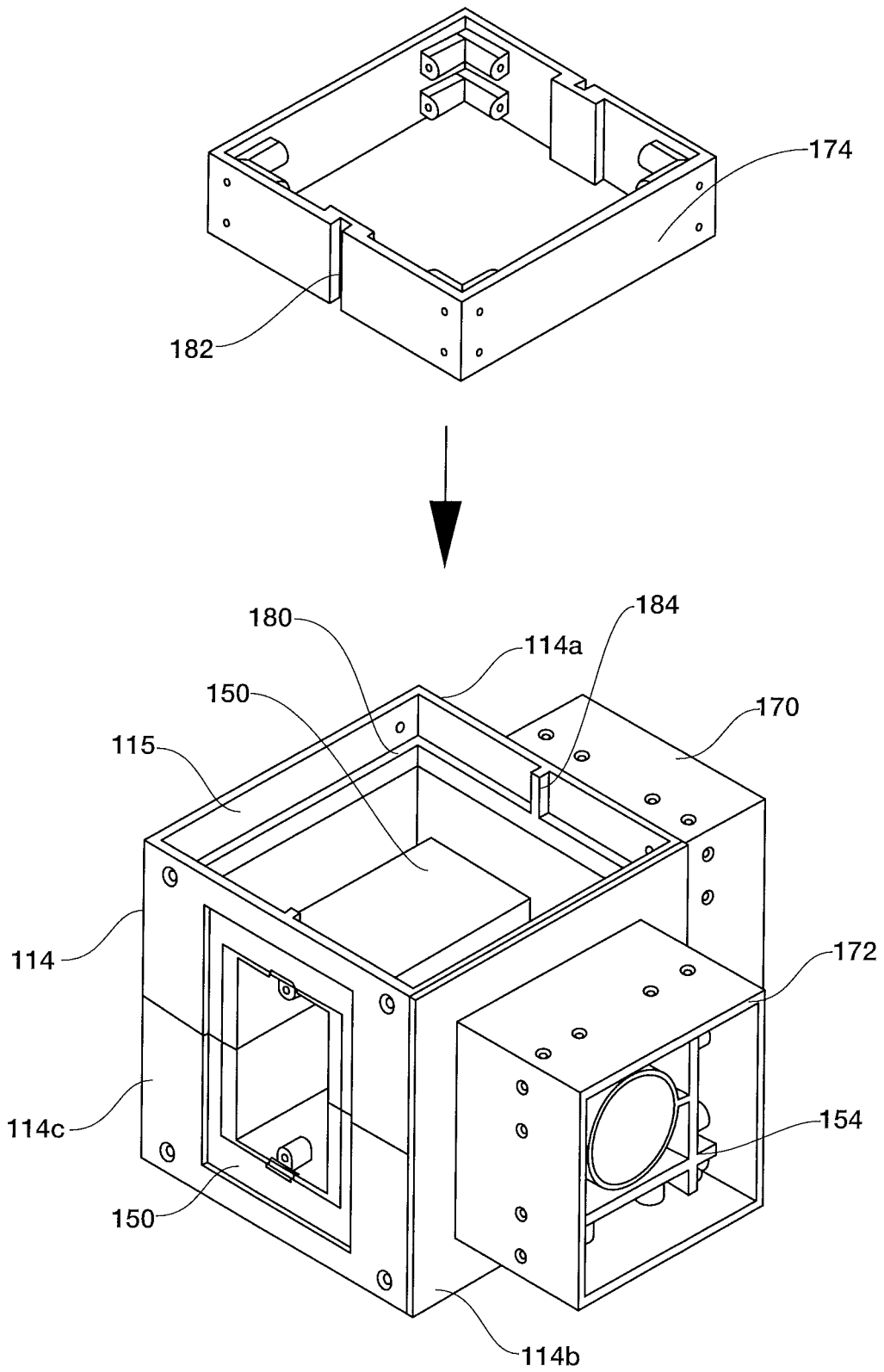
FIG. 17 is an overhead perspective view of a connector according to another embodiment.

Another example of a connector 114 is shown in FIG. 17. In this example, the first male element 170 is installed on a first face 114a and the second male element 172 is installed on a second face 114b, wherein the first and second faces are adjacent to each other on the body. Using the connector shown in FIG. 17, two landscaping timbers may be connected at an angle of about 90 degrees.

Figure 18:
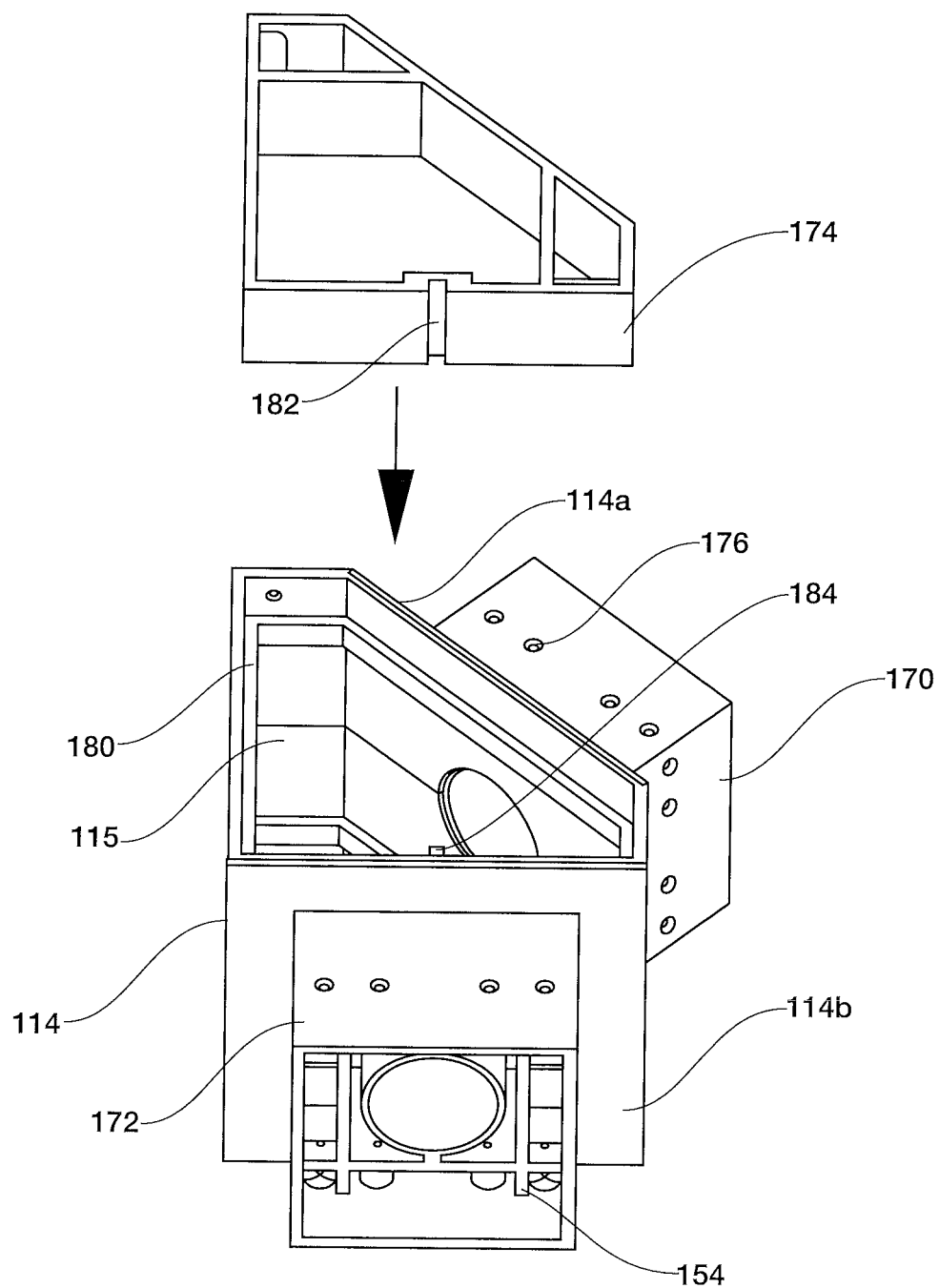
FIG. 18 is an overhead perspective view of a connector according to another embodiment.

In certain embodiments, the body of the connector 114 may comprise shapes other than a cuboid. As seen in FIG. 18, the body may comprise a substantially pentagonal shape. The first male element 170 is installed on a first face 114a and the second male element 172 is installed on a second face 114b. Using the connector shown in FIG. 17, two landscaping timbers may be connected at an angle greater than 90 degrees but less than 180 degrees.

In operation, the present invention may also be considered a method for arranging a set of landscaping timbers. For example, the method includes partially inserting a connector into a channel of a first landscaping timber and inserting the remaining exposed portion of the connector into a channel at an end of a second landscaping timber to connect the two landscaping timbers. Alternatively, if the connector is integrated with the first landscaping timber, then the method may simply comprise the step of inserting the exposed connector to the channel of a second landscaping timber. The method may further include stacking connected landscaping timbers with a plurality of other connected landscaping timbers.

The method may comprise aligning the first and second landscaping timbers, inserting a connector into one end of the first landscaping timber and the remaining portion of the connector into one end of the second landscaping timber, and moving the timbers together end to end so the ends of the landscaping timbers abut. The ends of the landscaping timbers may abut each other at substantially 180 degrees. Alternatively, the method may comprise aligning and connecting the first and second landscaping timbers at an angle other than 180 degrees.

The method may alternatively comprise partially inserting the connector into a channel formed on a face of the first landscaping timber whereby the first landscaping timber and second landscaping timber are aligned at an angle with the end of the second landscaping timber abutting the face of the first landscaping timber.

In embodiments wherein the landscaping timbers are outfitted with an electrical outlet, the method may further include the step of connecting an electronic device into an outlet on the face of a landscaping timber. Similarly, the method may include the steps of flipping an electrical switch or powering on/off a light depending on the electrical fitting installed within the landscaping timber.

There are several benefits of the improved landscaping tie system and methods disclosed herein. For example, since each landscaping timber includes an inner hollow channel, the landscaping timbers are lighter in weight compared to traditional railroad ties. Moreover, the inner channel enables electrical fittings to be installed onto the timbers, while at the same, concealing the wiring. Yet, the system remains easy to assemble and the timbers can be arranged in multiple configurations.

The timbers can be sold assembled and then joined together at a jobsite. Alternatively, the boards can be assembled into the timbers at a jobsite. Components of the assembled landscape wall can be sold together as a kit.

Certain modifications and improvements will occur to those skilled in the art upon reading the foregoing description. By way of example, the connectors could be adapted to adjoin three or more landscaping timbers. It should be understood that all such modifications and improvements have been omitted for the sake of conciseness and readability, but are properly within the scope of the following claims.

What is claimed is:

1. A landscaping system comprising
a plurality of landscaping timbers, each landscaping timber comprising
four flat wooden boards each having an inside face, an outside face and two longitudinal edges, each of the inside face, outside face and longitudinal edges at right angles to each next adjacent one of the inside face, outside face and longitudinal edges,
the four flat wooden boards arranged so that each of the four flat wooden boards has a longitudinal edge abutting the inside face of the next adjacent wooden board and so that the four flat wooden boards define a perimeter face of a timber and an inner channel inside the perimeter face, and
a plurality of connectors, each connector adapted for joining two landscaping timbers by having an outer profile configured to nest within the channel of the two landscaping timbers and further comprising a center joint comprising a prism for mounting the four flat boards, wherein the four flat boards are mounted onto the center joint so that the four flat boards define a perimeter face of a timber and an inner channel inside the perimeter face, whereby the center joint is positioned within the inner channel wherein the center joint has a channel adapted to receive a connector for joining with another landscaping timber.

2. A landscaping system as claimed in claim 1, wherein two landscaping timbers are joined by a connector with an outer profile to nest within the inner channel of each of the two landscaping timbers to establish an increased size timber arrangement.

3. A landscaping system as claimed in claim 2, wherein the connector has a length with an angle other than 180°.

4. A landscaping system as claimed in claim 2, wherein the connector nests within a channel of the center joint of each of the two landscaping timbers.

5. A landscaping system as claimed in claim 2, wherein an electrical conductor passes through the channel and is operatively connected to an electrical fitting.

6. A landscaping system as claimed in claim 5, wherein the electrical fitting is an electrical outlet.

7. A landscaping system as claimed in claim 1, further including an end cap at least partially inserted within the inner channel.

8. A landscaping system as claimed in claim 1, wherein each board is comprised of wood with ribs on each outside face.

9. A landscaping system as claimed in claim 1, wherein each board is comprised of plastic with ribs on each outside face to simulate wood.

10. A landscaping system as claimed in claim 1, wherein each landscaping timber comprises four flat wooden boards mounted onto a center joint within the channel whereby the connector has an outer profile configured to nest within a channel of the center joint.

11. A landscaping system as claimed in claim 1, wherein the connector is configured to connect two or more landscaping timbers and comprises
    a body comprising a hollow prism having a plurality of faces,
    a first male element protruding from a first face of the body and adapted to be inserted into a channel of a first landscaping timber,
    a second male element protruding from a second face of the body and adapted to be inserted into a channel of a second landscaping timber,
    an electrical box installed within the hollow prism and accessible on a third face of the body, and
    an electrical conduit hole within each connector adapted for electrical wire routing to the electrical box.

12. The landscaping system of claim 11, wherein the first face of the connector is located adjacent to the second face of the body whereby the first male element and the second male element are adapted to connect two landscaping timbers at an angle less than 180 degrees.

13. The landscaping system of claim 12, wherein the angle is about 90 degrees.

14. The landscaping system of claim 11, wherein the first face of the connector is located on an opposing side of the body in relation to the second face whereby the first male element and the second male element are adapted to connect two landscaping timbers at an angle of about 180 degrees.

15. The landscaping system of claim 11, wherein the body is substantially cuboidal.

16. The landscaping system of claim 11, wherein the first male element and the second male element have holes that are adapted to receive a fastener for securing the first and second male elements to the first and second landscaping timbers.

17. A landscaping system as claimed in claim 1, wherein the longitudinal edge of at least one wooden board has a tongue to engage a groove on the inside face of the next adjacent wooden board.

18. A landscaping system comprising
    a plurality of landscaping timbers, each landscaping timber comprising
    four flat wooden boards each having an inside face, an outside face and two longitudinal edges, each of the inside face, outside face and longitudinal edges at right angles to each next adjacent one of the inside face, outside face and longitudinal edges,
    the four flat wooden boards arranged so that each of the four flat wooden boards has a longitudinal edge abutting the inside face of the next adjacent wooden board and so that the four flat wooden boards define a perimeter face of a timber and an inner channel inside the perimeter face, and
    a plurality of connectors, each connector adapted for joining two landscaping timbers by having an outer profile configured to nest within the channel of the two landscaping timbers,
    wherein two landscaping timbers are joined by a connector with an outer profile to nest within the inner channel of each of the two landscaping timbers to establish an increased size timber arrangement, an electrical conductor passes through the channel and is operatively connected to an electrical fitting and the electrical fitting is installed in the connector.

19. A landscaping system as claimed in claim 18, wherein two landscaping timbers are joined by a connector with an outer profile to nest within the inner channel of each of the two landscaping timbers to establish an increased size timber arrangement.

20. A landscaping system as claimed in claim 19, wherein the connector has a length with an angle other than 180°.

21. A landscaping system as claimed in claim 18, further including an end cap at least partially inserted within the inner channel.

* * * * *